(12) United States Patent
So et al.

(10) Patent No.: US 8,433,936 B2
(45) Date of Patent: Apr. 30, 2013

(54) USB POWER CONSERVATION METHOD AND APPARATUS

(75) Inventors: Ming L. So, Danville, CA (US); Kenny Xu, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 395 days.

(21) Appl. No.: 12/270,748

(22) Filed: Nov. 13, 2008

(65) Prior Publication Data

US 2009/0254771 A1 Oct. 8, 2009

Related U.S. Application Data

(60) Provisional application No. 61/042,595, filed on Apr. 4, 2008.

(51) Int. Cl.
*G06F 1/26* (2006.01)
(52) U.S. Cl.
USPC ............................ 713/320; 713/322; 713/323
(58) Field of Classification Search .................. 713/320, 713/322, 323, 300; 710/308, 100, 104, 305, 710/310, 313, 306
See application file for complete search history.

(56) References Cited

U.S. PATENT DOCUMENTS

| | | | | |
|---|---|---|---|---|
| 5,933,611 A * | 8/1999 | Shakkarwar | ................ | 710/100 |
| 6,085,325 A * | 7/2000 | Jackson et al. | ................ | 713/300 |
| 6,085,330 A * | 7/2000 | Hewitt et al. | ................ | 713/322 |
| 6,460,143 B1 * | 10/2002 | Howard et al. | ................ | 713/323 |
| 6,467,042 B1 * | 10/2002 | Wright et al. | ................ | 713/320 |
| 6,708,278 B2 * | 3/2004 | Howard et al. | ................ | 713/323 |
| 6,816,976 B2 * | 11/2004 | Wright et al. | ................ | 713/323 |
| 6,938,103 B2 * | 8/2005 | Azzarito et al. | ................ | 710/6 |
| 7,206,883 B2 * | 4/2007 | Ho et al. | ................ | 710/260 |
| 7,231,468 B2 * | 6/2007 | Cline | ................ | 710/15 |
| 7,281,074 B2 * | 10/2007 | Diefenbaugh et al. | ........ | 710/260 |
| 7,340,550 B2 * | 3/2008 | Derr et al. | ................ | 710/308 |
| 7,480,739 B1 * | 1/2009 | Berendsen | ................ | 710/5 |
| 7,490,255 B2 * | 2/2009 | Diefenbaugh et al. | ........ | 713/320 |
| 7,634,587 B2 * | 12/2009 | Ferguson et al. | ................ | 710/5 |
| 7,702,825 B2 * | 4/2010 | Howard | ................ | 710/18 |
| 7,849,334 B2 * | 12/2010 | Juenemann et al. | ........ | 713/300 |
| 2003/0014677 A1 * | 1/2003 | Howard et al. | ................ | 713/323 |
| 2007/0113114 A1 * | 5/2007 | Tang | ................ | 713/323 |
| 2010/0082872 A1 * | 4/2010 | Fleming | ................ | 710/310 |
| 2010/0153760 A1 * | 6/2010 | Gupta et al. | ................ | 713/323 |

OTHER PUBLICATIONS

Compaq et al. Universal Serial Bus Specification. Revision 2.0. Apr. 27, 2000.*

(Continued)

*Primary Examiner* — Matthew D Spittle
(74) *Attorney, Agent, or Firm* — Volpe and Koenig, P.C.

(57) ABSTRACT

Embodiments of a method and system for conserving power used in a central processing unit (CPU) are described. An embodiment uses direct memory access (DMA) fetch suspend logic to allow the CPU to stay in a sleep state indefinitely until a break event occurs. Embodiments include power management monitoring and Universal Serial Bus (USB) descriptor monitoring logic. Power management monitor logic monitors the CPU sleep state and sets a status flag to the USB descriptor monitoring logic whenever the CPU is in a predefined sleep state. The USB descriptor monitoring logic monitors the fetching of linked descriptor lists. When the CPU status flag is raised, it causes monitoring of the descriptor fetch by the USB descriptor monitoring logic. If the USB controller has completed all of the descriptor fetches while the CPU sleep flag is true, this logic sets a flag to cause the USB controller to suspend DMA fetch operations.

16 Claims, 1 Drawing Sheet

OTHER PUBLICATIONS

Intel Corporation. Intel Atom Processor Z5xx Series. Datasheet. Mar. 2009.*

Akella et al. Intel Power Management for Embedded Applications. Version 1.0. May 2010.*

Lorch, Jacob. Operationg Systems Techniques for Reducing Processor Energy Consumption. 2001.*

* cited by examiner

USB POWER CONSERVATION METHOD AND APPARATUS

RELATED APPLICATIONS

This application claims the benefit of U.S. Provisional Patent Application No. 61/042,595, filed Apr. 4, 2008, which is incorporated by reference herein in its entirety.

TECHNICAL FIELD

The invention is in the field of central processing unit (CPU) power management.

BACKGROUND

When an idle Universal Serial Bus (USB) device attached to a personal computer (PC), the USB controller will continue fetching descriptor tables even though the list may be empty. The fetch operations cause the central processing unit (CPU) to exit a power saving state or mode, even if there is no work for the CPU to do, and this is wasted energy.

There is an existing mode known as asynchronous park mode, in which the USB controller is allowed to fetch multiple tables in one frame instead of fetching one table per frame over multiple frames. USB 2.0 uses a period of 125 microseconds for every frame. As an example, various CPUs have defined "C states" that indicate how much of the CPU function is available. The higher the C number, the less function is available. With asynchronous park mode, the CPU is able to stay in C3 state (a reduced-power state or sleep state) for the duration of multiple frames when the USB controller is not fetching. However, the CPU is still brought back to C0 state or C2 state (active, power-consuming states) whenever the USB controller is performing the data fetch. So although asynchronous park mode does make fetches more efficient, the CPU must still return to C0 state or C2 state every few hundred microseconds.

Figure 1:
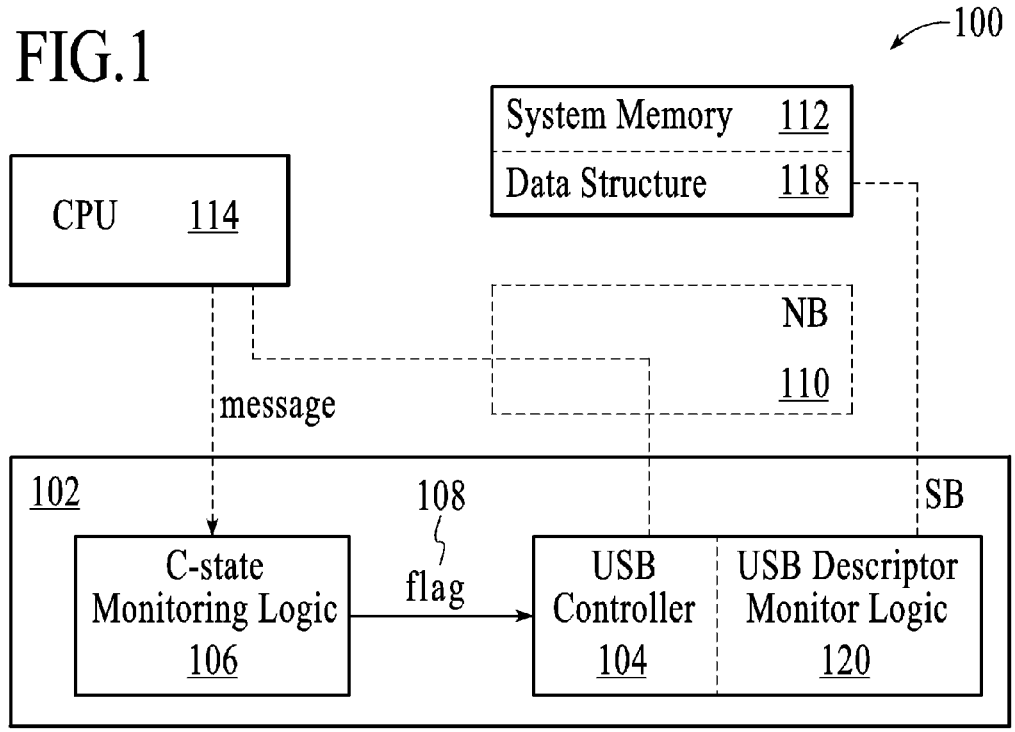
FIG. 1 is a block diagram of certain elements of a CPU system according to an embodiment.

The drawings represent aspects of various embodiments for the purpose of disclosing the invention as claimed, but are not intended to be limiting in any way.

DETAILED DESCRIPTION

Embodiments of a method and system for conserving power used in a central processing unit (CPU) are described. The operational principles of a Universal Serial Bus (USB) controller are exploited to reduce the power consumption caused by the presence of a USB device in a CPU system. An embodiment uses direct memory access (DMA) fetch suspend logic to allow the CPU to stay in a sleep state indefinitely until a break event occurs. Embodiments include power management monitoring and USB descriptor monitoring logic. Power management monitor logic monitors the CPU sleep state and sets a status flag to the USB descriptor monitoring logic whenever the CPU is in a predefined sleep state. In an embodiment, the predefined sleep state is a C2 or higher sleep state. The USB descriptor monitoring logic monitors the fetching of the linked descriptor lists. When the CPU status flag is raised, it causes monitoring of the descriptor fetch by the USB descriptor monitoring logic. If the USB controller has completed all of the descriptor fetches while the CPU sleep flag is true, this logic sets a flag to cause the USB controller to suspend DMA fetch operations. In the exemplary embodiments the CPU must be in a sleep state continuously throughout the period the USB controller traverses the link list in at least one complete loop. Anytime the CPU exits the sleep state, the USB descriptor monitoring logic is reset. Exiting of the CPU sleep state also causes the USB controller to resume the link list fetch immediately.

Per USB Open or Enhanced Host Controller Interface (OHCI/EHCI) standards (OpenHCI (Open Host Controller Interface) Specification, Rev. 1.0a, released October, 1996 and available from Hewlett Packard Development Company LP, and Enhanced Host Controller Interface Specification for Universal Serial Bus, Revision 1.0, dated Mar. 12, 2002 and available from Intel Corporation of Santa, Clara, Calif., USA, respectively, the contents of each of which are hereby incorporated herein by reference), a USB controller utilizes a double link list structure to move data between a system memory and the USB device(s). A first link list contains Endpoint Descriptor tables (ED). Each ED contains a pointer pointing to the transfer descriptor (TD) link list as well as a pointer to the next ED. Typically an ED is associated with a USB device or with one of its functions if the device is a multi-function device. Transfer Descriptor (TD) tables make up a second link list which contains pointers pointing to the actual data block in the system memory.

When the USB controller is complete with one TD or ED, it will mark that descriptor with a completion status. Another characteristic of these link lists is that they are usually constructed in a circular fashion. The last endpoint descriptor will point back to the first one. When software has new data to send or receive, it will reuse the ED and TD structures by updating the data pointers and status accordingly. The above description applies to an embodiment with an Open Host Controller Interface (OHCI) that is used according to the USB 1.1 specification. The principle is similar in the Enhanced Host Controller Interface (EHCI) that is used according to the USB 2.0 specification. In OHCI, the link list is referred as a descriptor table whereas it is called a queue list in the EHCI.

Whenever the USB bus is populated with device(s), the USB host driver will prepare these link lists. The USB host controller will then traverse through these link lists, process the data structure (if present), and pass the data between the device and the memory. For the case of an idling device (e.g., device is not performing any function), the descriptor table may contain an empty table. The USB host controller will still fetch the empty link list and discover that it is empty. In this case, the USB controller will simply move on to process the next descriptor.

In a mobile computing system (a notebook computer, for example), the CPU is often put into C3 state to conserve power consumption. Whenever there is a data fetch to or from the memory, the CPU must be brought back to C0 or C2 state in order to make sure the data is coherent. Thus, with the USB device present, the USB controller typically causes the CPU to be out of C3 state periodically.

It is known that when the when the CPU is in a C2 or higher sleep state, software is in a halt state and cannot create any new data structures such as Endpoint or Transfer Descriptor tables. USB operates in a circular link list fashion. Also, when the USB controller finishes the end of the link list, it will go back to the beginning of the list and restart the link list processing. Given the existence of these conditions, it is safe to have USB controller stop fetching the descriptors, if USB controller has completed all of descriptors while the CPU is still in a sleep state (C2 or higher state).

FIG. 1 is a block diagram of certain elements of a CPU system 100. CPU system is representative of an AMD™ architecture, but embodiments are not so limited. The system 100 includes a CPU 114, and a system memory 112. The system memory 112 stores a data structure 118. The system 100 further includes a South Bridge (SB) 102 and a North Bridge (NB) 110. The NB 110 is shown with a dotted line because the NB 110 can also be integrated with the CPU 114.

The SB 102 includes C-state monitoring logic 106 and USB controller 104. A message 116 is sent to the monitoring logic 106 to inform the monitoring logic of the C state of the CPU 114. The monitoring logic 106 sends a flag 108 to the USB controller 104 when the CPU 114 is in a sleep state. It is advantageous to stop the USB controller 104 from fetching data when the CPU 114 is in a sleep state because when the USB controller 104 fetches data from the CPU 114 the CPU is transitioned from a deep sleep state to a light sleep state. In an embodiment, in order to stop the USB controller 104 from fetching data when the CPU 114 is in a sleep state, the data structure 118 is tracked by USB descriptor monitoring logic 120 to determine when it is safe to stop fetching, and it is further determined when the CPU 114 is in a sleep state. When the appropriate conditions exist, the flag 108 is sent to the USB controller 104. The flag 108 is a "sleep" flag that tells the USB controller 104 to suspend DMA fetch operations. Alternative embodiments include multiple CPUs 114. In addition, the power conservation method and apparatus as disclosed and claimed is not limited to USB devices, but could encompass any type of bus used by any type of bus devices. The monitoring logic 120 encompasses data structure monitoring logic for monitoring any type of data structure that governs bus activity. The monitoring logic 120 is configurable to determine whether there is scheduled activity on a bus of any type according to the applicable bus protocol.

Figure 2:
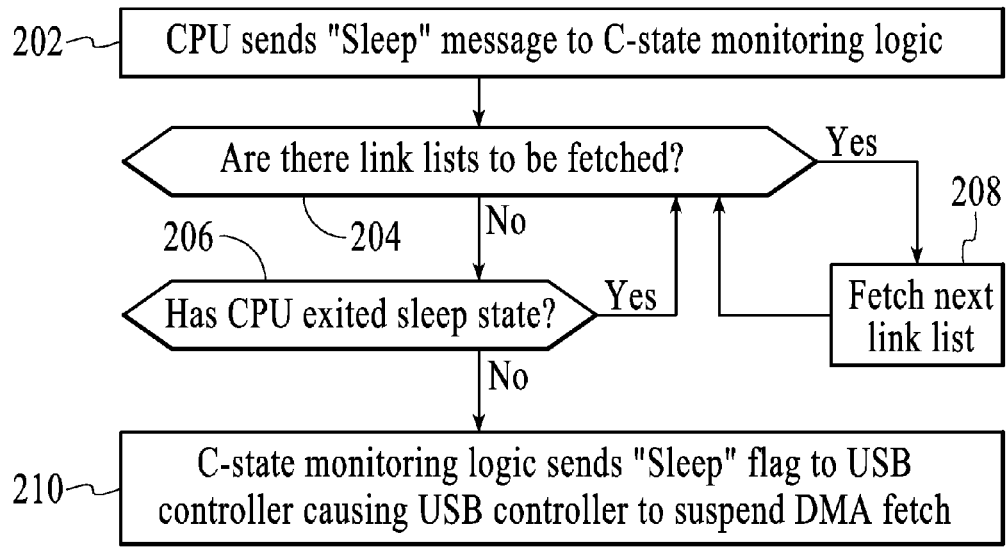
FIG. 2 is a flow diagram that illustrates a process of USB power conservation according to an embodiment.

FIG. 2 is a flow diagram that illustrates a process 200 of USB power conservation according to an embodiment. At 202, the CPU sends a "Sleep" message to the C-state monitoring logic indicating that the CPU is entering a high C number state, for example C3. At 204 it is determined whether there are link lists yet to be fetched. This is determined by the USB descriptor monitoring logic monitoring the data structure. If there are link lists to be fetched, the next link list is fetched at 208. If there are no link lists to be fetched, it is determined whether the CPU has exited the sleep state. This is determined by whether or not the CPU has sent a new message to the C-state monitoring logic in the interim to indicate a different sleep state. If the CPU has exited the sleep state (to a lower number C state, for example), then the process returns to 204 to determine whether to fetch link lists. If the CPU has not exited the sleep state, the C-state monitoring logic sends the "Sleep" flag to the USB controller. The "Sleep" flag tells the USB controller to suspend DMA fetch operations.

Anytime the CPU exits the sleep state, a new C-state message will be sent from the CPU to the C-state monitoring logic. This also causes the USB descriptor monitoring logic to be reset. Exiting of the CPU sleep state will also cause the USB controller to resume the link list fetch immediately.

The embodiments shown are just examples and do not limit the scope of the claimed invention. Alternative embodiments include multiple CPUs for example. In addition, the power conservation method and apparatus as disclosed and claimed is not limited to USB devices, but could encompass any type of bus used by any type of bus devices. The monitor logic 120 encompasses data structure monitoring logic for monitoring any type of data structure that governs bus activity.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. Accordingly, the inventors reserve the right to add additional claims after filing the application to pursue such additional claim forms for other aspects of the method and system.

What is claimed is:

1. A central processing unit power conservation apparatus, comprising:
    a monitoring logic configurable to determine whether there is data to be fetched; and
    a sleep state monitoring logic configured to monitor a sleep state of a central processing unit (CPU) and receive a first sleep message from the CPU indicating that the CPU is entering a sleep state, wherein based on a determination that a second sleep message from the CPU has not been received, the sleep state monitoring device is further configured to send a sleep flag to a bus controller to suspend fetch operations related to the bus controller based on a determination that there are not data to be fetched.

2. The apparatus of claim 1, wherein the sleep flag causes the bus controller to inhibit fetch operations until a break event occurs.

3. The apparatus of claim 2, wherein a break event comprises the CPU exiting the sleep state.

4. The apparatus of claim 1, wherein the sleep state comprises one or more of a plurality of defined states that indicate how much functionality of the CPU is available.

5. The apparatus of claim 1, wherein the data structure monitoring logic is configurable to monitor a Universal Serial Bus (USB).

6. The apparatus of claim 5, wherein the monitoring logic monitors link lists.

7. The apparatus of claim 6, wherein the fetch operations comprise direct memory access (DMA) fetch operations.

8. The apparatus of claim 7, wherein DMA fetch operations resume when a break event occurs.

9. A power conservation method in a computer system, the method comprising:
    monitoring a current sleep state of at least one central processing unit (CPU);
    determining whether there is data to be fetched on a bus coupled to the CPU;
    receiving a first sleep message from the at least one CPU indicating that the at least one CPU is entering a sleep state, and based on a determination that the sleep state monitoring logic does not receive a second sleep message from the at least one CPU, sending a sleep flag to a bus controller to suspend operations related to the bus controller based on a determination that there are no data to be fetched on the bus;
    and
    monitoring a data structure wherein the data structure comprises a Universal Serial Bus (USB) data structure according to a USB bus protocol.

10. The method of claim 9, further comprising resuming data-fetching operations on the bus in the event of a change in the sleep state of the CPU.

11. The method of claim 9, wherein inhibiting comprises suspending direct memory access (DMA) fetches.

12. The method of claim 9, wherein monitoring a current sleep state comprises monitoring a C-state of the CPU.

13. A computer-readable medium having instruction stored thereon, that when executed in a computer system cause the performance of a power conservation method in the computer system, the method comprising:
    monitoring at least one central processing unit (CPU) to determine a current sleep state;
    monitoring a data structure to determine whether there are pending data fetching operations on a bus coupled to the CPU; and
    receiving a first sleep message from the at least one CPU indicating that the at least one CPU is entering a sleep state, and based on a determination that the sleep state monitoring logic does not receive a second sleep message from the at least one CPU, sending a sleep flag to a bus controller to suspend operations related to the bus controller based on a determination that there are no pending data fetching operations on the bus;
    wherein the data structure comprises a Universal Serial Bus (USB) data structure according to a USB bus protocol.

14. The computer-readable medium of claim 13, the method further comprising resuming data operations on the bus in the event of a change in the sleep state of the CPU.

15. The computer-readable medium of claim 13, wherein inhibiting comprises suspending direct memory access (DMA) fetches.

16. The computer-readable medium of claim 13 wherein monitoring a current sleep state comprises monitoring a C-state of the CPU.

* * * * *